United States Patent [19]

Yano

[11] Patent Number: 4,511,236

[45] Date of Patent: Apr. 16, 1985

[54] ELECTROPHOTOGRAPHIC PROCESS

[75] Inventor: Takashi Yano, Tokyo, Japan

[73] Assignee: Ricoh Company, Ltd., Tokyo, Japan

[21] Appl. No.: 452,899

[22] Filed: Dec. 27, 1982

[30] Foreign Application Priority Data

Dec. 24, 1981 [JP] Japan ........ 56-210312

[51] Int. Cl.[3] ........ G03B 27/34; G03B 27/40; G03B 27/70; G03B 15/04

[52] U.S. Cl. ........ 355/3 BE; 355/14 R; 355/57; 355/60

[58] Field of Search ........ 355/3 BE, 8, 11, 14, 355/16, 55, 56, 57, 60

[56] References Cited

U.S. PATENT DOCUMENTS 4,074,934 2/1978 Satomi ........ 355/14 R
4,374,619 2/1983 Spinelli et al. ........ 355/8 X

FOREIGN PATENT DOCUMENTS 135880 10/1980 Japan ........ 355/3 BE

*Primary Examiner*—A. T. Grimley
*Assistant Examiner*—Terry Flower
*Attorney, Agent, or Firm*—Oblon, Fisher, Spivak, McClelland & Maier

[57] ABSTRACT

A photosensitive member in the form of a belt moves along an arcuate path, and during such movement, it is slitwise exposed to a light image of an original. A developing step and a transfer step, which transfers a visual image obtained by the developing step onto a transfer medium, are repeated a number of times $N_T$, which is equal to or greater than two, upon an electrostatic latent image formed on the photosensitive member. The photosensitive member includes a number of segments $N_S$, equal to or greater than one, each of which defines an image forming region. In an area where it is exposed, the photosensitive member assumes a planar configuration, and throughout the exposure, the slitwise exposure location moves through the area at a uniform rate in the same direction as the direction of movement of the photosensitive member.

12 Claims, 5 Drawing Figures

F I G. 3 (II)

F I G. 3 (III)

ELECTROPHOTOGRAPHIC PROCESS

BACKGROUND OF THE INVENTION

1. Field of the Invention

This invention relates to an electrophotographic process.

2. Description of the Prior Art

An electrophotographic process is well known in the art in which a photosensitive member of a photoconductive member of a photoconductive material in the form of a belt or a drum moves along an arcuate path so that its peripheral surface undergoes a cyclic movement in a given direction. During such movement, it is slitwise exposed to a light image of an original to form an electrostatic latent image corresponding to the original, which latent image is developed to produce a visual image, which is in turn transferred onto a transfer medium such as paper for a subsequent fixing step.

An arrangement to carry out such an electrophotograhic process has been improved in various aspects. One of the improvements relates to an improvement in the operational efficiency i.e. an increase speed. An improvement in the operational efficiency directly translates into an increase in the number of copies which can be produced from prescribed original during a given time interval.

One of the problems which inhibits an increase in the speed of the electrophotographic process is that of a scanback. Generally, a slitwise exposure of a photosensitive member takes place as a result of a corresponding scan of the original. The original is scanned by the relative movement between the original and the exposure optics. The slitwise exposure of the photosensitive member takes place during the relative movement which occurs in a given direction. Upon completion of the slitwise exposure, the relative movement in the opposite direction must take place before the starting condition is resumed preparatory to the initiation of another slitwise exposure. The term "scan-back" refers to the reestablishment of the original positional relationship between the original and the exposure optics subsequent to the completion of the slitwise exposure. Obviously, no slitwise exposure of the photosensitive member can take place during the scan-back except where special exposure optices are employed. It then follows that, when representing the time required to effect slitwise exposure of the photosensitive member by $T_S$ and the time required for the scan-back by $T_R$, it takes a total time of $T_S+T_R$ to produce a single copy.

A speed-up of the electrophotograhic process means a reduction in the total time of $T_S+T_R$. To reduce the total time, either $T_S$ or $T_R$ must be reduced. The time $T_S$ can be reduced to a certain degree as by the exploitment of a highly sensitive photosensitive member, but in practice it is very difficult. It then follows that the time $T_R$ for the scan-back must be reduced. However, there is a limitation on this possibility, considering the inertia of movable parts which are utilized to scan the original, and consequently such reduction presents a very difficult problem.

This represents a scan-back problem, meaning the difficulty experienced in reducing the scan-back time $T_R$. It is even more difficult if not impossible to reduce it to zero. However, instead of reducing the scan-back time $T_R$ to zero in practice, it is possible to provide an apparent reduction of the scanback time to zero in order to achieve an increase in the speed of the electrophotographic process. Specifically, a photosensitive member in the form of a belt or drum is caused to move along an arcuate path so that its peripheral surface undergoes a cyclic movement in a given direction. During such movement, the photosensitive member is subject to a slitwise exposure to a light image of an original to form a corresponding electrostatic latent image thereon. A developing step and a transfer step which transfers the resulting visual image are repeated a plurality of times upon the latent image formed. When the same latent image is utilized a plurality of times, the single exposure is sufficient to produce $N_T$ copies if the latent image is utilized a plurality of times $N_T$. For an integer n which is defined by the inequality $1 \leqq n \leqq N_T$, $(N_T+n)$ copies can be obtained by two exposures. In this instance, during the time the latent image is utilized $N_T$ times after the first exposure has been completed, the scan-back may take place, whereby the second exposure can be initiated immediately after $N_T$ copies have been produced. In other words, this represents a zero time for the scan-back, assuming the proposition that a single exposure is required for each copy produced. This is referred to herein as apparent zero time for the scan-back.

As discussed above, a speed-up of the electrophotographic operation is enabled by utilzing an apparent zero time for the scan-back in which an electrostatic latent image formed is utilized a number of times. The problem then to be solved is the manner of increasing the speed of operation of such electrophotographic process in which the latent image is utilized a number of times. A first approach to solve this problem will be the exploitment of a photosensitive member having an increased optical sensitivity. The increased sensitivity permits the time required for the slitwise exposure to form an electrostatic latent image to be reduced. However, it is not a simple matter to exploit such a photosensitive member. A second approach is to provide an increased number of segments $N_S$ of the photosensitive member. The number of segments as termed herein refers to the number of image forming regions which can be encompassed within the peripheral length of the photosensitive member.

By way of example, it may be assumed that $N_S=4$, and $N_T-10$. In this instance, four electrostatic latent images can be formed on the photosensitive member. Once four latent images are formed, four copies can be produced during one revolution of the photosensitive member, and hence a number of copies can be consecutively produced up to forty copies. If a certain length of time is required to form the four latent images, the photosensitive member may be subject to a high speed rotation subsequent to the formation of the latent images, so that the average time required to produce a single copy will be reduced when forty copies are to be produced, for example, thus resulting in an increased speed of operation of the electrophotographic process. However, there is another problem with this technique. The value of $N_T$ has been assumed to be equal to 10 in the example given above and such a figure for $N_T$ is fully possible if the required image quality of the copy produced is one which is sufficient to serve practical purposes. However, it is expected that the demand required on the image quality will be higher in the near future, and if the image quality of the copy should be sufficient to satisfy such demand, the limit of $N_T$ will be on the order of four at most. It will be seen that a value of $N_T$ of this order cannot result in a substantial improvement in the speed of operation.

SUMMARY OF THE INVENTION

It is an object of the invention to provide an electrophotographic process of the type in which an electrostatic latent image is utilized a plurality of times and which is capable of improving the operational efficiency while utilizing an existing photosensitive member, thus avoiding the use of a special photosensitive member of an increased sensitivity.

This object is achieved in accordance with the invention by utilizing a photosensitive member in the form of a belt having a number of segments $N_S$ which is equal to or greater than one. Obviously, the number of times the latent image is repeatedly utilized is given by $N_T \geqq 2$. The photosensitive member has a planar configuration in an area where it is exposed, and the slitwise exposure location moves through the area at a uniform rate in the direction of movement of the peripheral surface of the photosensitive member, thus performing a slitwise exposure for the photosensitive member.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 1:
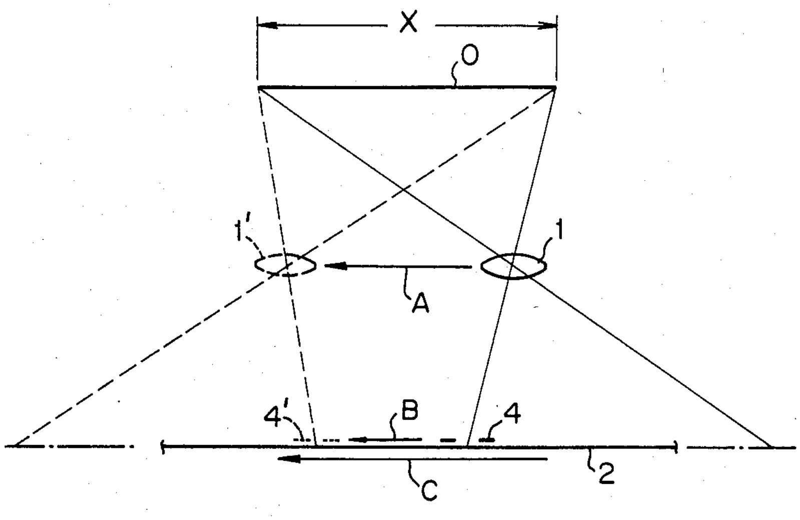
FIG. 1 is a schematic illustration of an exposure technique for a photosensitive member which is used in the present invention.

The basic principle of operation of the invention will be described first. At this end, it is assumed that $N_S=1$. In other words, a single electrostatic latent image is formed on the peripheral surface of a photosensitive member which is in the form of a belt. Representing the peripheral length of the photosensitive member by $l_s$ and the length of an electrostatic latent image by l, $N_S=1$ means that $2l>l_s>l$. Theoretically, it may be assumed that $l_s \geqq l$. However, in practice, a margin is required for the separation of transfer sheets, and hence $l_s=l$ is not a possible choice.

It will be seen that in this instance, a single copy is produced during one revolution of the photosensitive member. Accordingly, an improvement in the copying efficiency can be accomplished by increasing the speed of rotation of the photosensitive member. Since the same latent image is repeatedly utilized, the time $T_R$ for the scan-back is apparently equal to zero. Then, under usual situations, an increase in the speed of rotation of the photosensitive member corresponds to a reduction in the slitwise scan time $T_S$. However, in order to realize effective exposure while reducing the slitwise exposure time, it is necessary to increase the emission of light from a light which illuminates the original. An even greater increase in the light emission from the light is required to form an electrostatic latent image having an increased electrostatic contrast, as compared with the usual electrophotographic process, when the latent image is repeatedly utilized.

In an electrophotographic copying machine, the power dissipation is at its maximum when the slitwise exposure of the photosensitive member takes place. The power dissipation is reduced when no slitwise exposure takes place, at least by the amount which is consumed by the light which illuminates the original.

On the other hand, it is to be noted that the power supplied to an electrophotographic copying machine is generally normalized. For example, in Japan, the power is normalized to 100 V and 15 A, and greater power cannot be supplied without implementing a special power network. Hence, the maximum value of power dissipation, and hence the maximum power dissipation by the light, is limited by the power supply of 100 V and 15 A.

Accordingly, when the time $T_S$ required for the slitwise exposure to define an electrostatic latent image having a sufficiently high electrostatic contrast is determined as the maximum power is supplied to the light, a further reduction in the time $T_S$ is impossible. Nevertheless, to improve the operational efficiency, the speed of rotation of the photosensitive member must be increased while maintaining the limit value of the time $T_S$ for the slitwise exposure.

In accordance with the invention, such requirement is attained by a special slitwise exposure technique in which the photosensitive member is arranged to present a planar configuration in the area of exposure and a slitwise exposure location is to moved through the area of exposure at a uniform rate in the direction of movement of the photosensitive member while performing a slitwise exposure.

Such slitwise exposure technique will be described with reference to FIG. 1 where an original is represented by the numeral 0, a focusing lens system by a numeral 1, the photosensitive member by the numeral 2 and a slit plate by the numeral 4.

As shown, the original 0 is placed in planar form. The photosensitive member 2 is in the form of a belt and presents a planar configuration in the area of exposure, and its peripheral surface moves in the direction of the arrow C as the photosensitive member follows an arcuate path. Both the focusing lens system 1 and the slit plate 4 are reciprocately movable between a solid line position and another position shown in broken lines. An exposure station is defined between both of the positions of the slit plate 4.

A slitwise exposure takes place by moving both the focusing lens system 1 and the slit plate 4 at a uniform speed from their solid line positions to their broken line positions. Obviously, the original 0 is scanned by illumination from a light, not shown, as the lens system 1 moves. It may be assumed that the focusing lens system 1 moves in a direction indicated by the arrow A with a speed of $V_L$ during the slitwise exposure. Assuming that the magnification is unity in the arrangement shown, a movement of the lens system 1 with the speed $V_L$ causes the light image of the original which is focused by the lens system 1 to move with a speed of $2V_L$. Accordingly, to achieve a proper exposure of the photosensitive member 1, it is necessary that the peripheral speed $V_K$ of the photosensitive member in the direction of the arrow C must be $2V_L$ so that the relative speed of movement between the photosensitive member and the light image be maintained zero. Assuming that the original 0 has an effective scan length of X and requires a time length of $T_S$ for its scanning, it follows that the scan speed $V_0$ of the original 0 is equal to $X/T_S$. The lens system 1 moves through a distance of $V_LT_S$ while the light image moves through a distance of $2V_LT_S=V_KT_S$ during the slitwise exposure.

The exposure of the photosensitive member 1 is initiated at the solid line position of the slit plate 4 and is completed at its position shown in broken lines. The slit plate 4 moves through a distance of $V_KT_S-X$.

In the conventional slitwise exposure scheme, the slitwise exposure location remains invariable, and hence the slit plate 4 would not move. In other words, in the conventional exposure technique, $V_KT_S-X=0$, and the peripheral speed of the photosensitive member will be $V_K=X/T_S$, which is equal to the scan speed $V_0$ of the original 0.

However, in the scan technique of FIG. 1, the distance Y through which the slit plate moves in the direction B is positive and is equal to $V_KT_S-X$. Hence, with this technique, the peripheral speed $V_K$ of the photosensitive member is $(X+Y)/T_S=V_0+Y/T_S$, making it clear that the peripheral speed can be increased by an amount $Y/T_S$ as compared with the conventional exposure technique.

Stated differently, when the described slitwise exposure technique is employed, the same time $T_S$ as in the conventional technique can be used for the exposure of the photosensitive member while allowing the peripheral speed thereof to be increased. This means that an electrostatic latent image of high quality, which is comparable to that obtained with a conventional process, is assured while enabling an improvement in the operational efficiency.

It will be evident from FIG. 1 that the slitwise exposure technique has an actual scan-back time of a finite value, and hence when the latent image is used only once, no improvement in the operational efficiency can be achieved. Accordingly, it can be said that one feature of the invention resides in a unique combination of the technique in which the same latent image is repeatedly utilized and the special slitwise exposure technique mentioned above.

What has been described above is for a single segment format of the photosensitive member. The number of times $N_T$ the latent image is utilized may be two, three or four. However, when a number of segments equal to or greater than two is used, a certain relationship between the number of segments $N_S$ and the number of utilizations $N_T$ must be satisfied to improve the operational efficiency.

Figure 2:
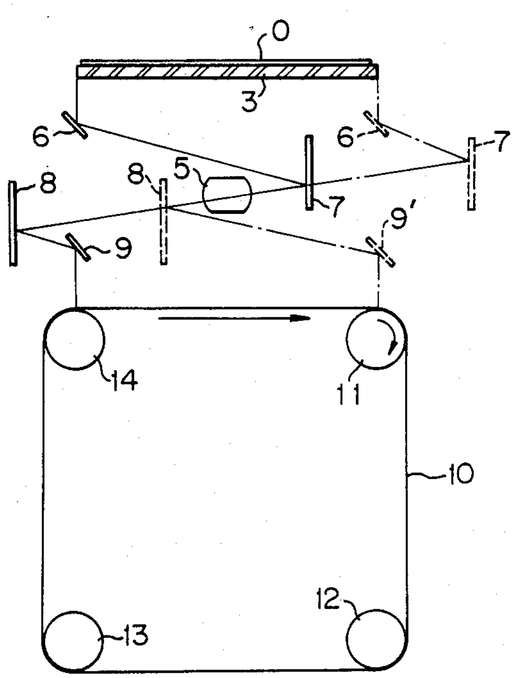
FIG. 2 is a schematic illustration of an arrangement for carrying out the invention in which the number of segments $N_S$ is equal to four, particularly showing the optics and the photosensitive member thereof.

This will be described below for a number of segments $N_S$ which is equal to four. FIG. 2 schematically shows an arrangement which may be used to carry out the invention in this instance. An original 0 is adapted to be placed on a glass pane 3, and its image is projected through a focusing lens system 5 and a plurality of mirrors, 6, 7, 8 and 9 onto a photosensitive member 10. It is to be understood that the photosensitive member 10 has a number of segments $N_S$ which is equal to four. As shown, the photosensitive member extends around a plurality of pulleys 11, 12, 13 and 14 and can be driven in a clockwise direction. The original 0 is scanned through a movement of the mirrors 6, 7. The mirrors 8 and 9 also move in synchronized relationship with the movement of the mirrors 6 and 7, providing a slitwise exposure of the photosensitive member 10. The mirrors 6 to 9 are adapted to move from their positions shown in solid lines to their positions shown in broken lines during the slitwise exposure. As referenced to the speed of movement of the mirror 6, the speed of movement of the mirror 7 is one-half that value, and the speed of movement of the mirror 8 is one-half the speed of movement of the mirror 9.

It is to be understood that the magnification is chosen to be unity. As will be apparent from FIG. 2, a portion of the photosensitive member which is adapted to be exposed extends across the pulleys 14 and 11, and has a length which is equal to the scan length of the original. The scanning to achieve an exposure begins at the location of the pulley 14 and terminates at the location of the pulley 11. Since the portion of the photosensitive member which is exposed has the same length as the scan length of the original and the magnification used is unity, the mirrors 6 and 9 move with an equal speed of movement as do the mirrors 7 and 8. This slitwise exposure technique corresponds to the choice X=Y in accordance with the above description given in connection with FIG. 1. Accordingly, the peripheral speed of the photosensitive member 10 is twice the speed of scanning the original or the speed of movement of the mirror 6.

It is initially assumed that the photosensitive member 10 has four segments. This means that an electrostatic latent image should be formed on each segment of the photosensitive member 10 to achieve an effective utilization of the individual segments, thereby permitting a smooth and high speed operation of the electrophotographic process.

Figure 3:
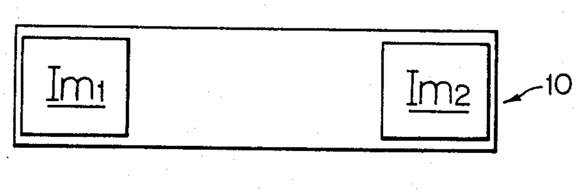
FIG. 3 is an illustration of the sequence in which four latent images are formed for an arrangement of $N_S=4$, particularly illustrating the relative position between the latent images.
Figure 3:
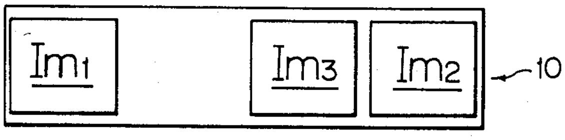
Figure 3:
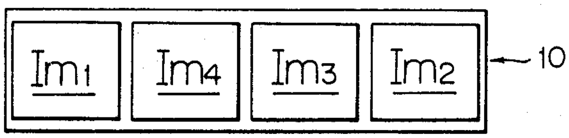

In practice, the exposure optics requires a scan-back time. In order to enable an electrostatic latent image to be formed on one segment and another latent image to be formed on another segment which directly follows the first mentioned segment, it is necessary to stop the movement of the photosensitive member momentarily after the formation of the first latent image to wait for the scan-back time to pass. This defeats the very purpose of improving the operational efficiency. As one way to form four latent images on different segments of the photosensitive member while allowing the photosensitive member to continue running, and taking the scan-back time into consideration, it is contemplated to form latent images on every third segment. Specifically, after a first latent image is formed on a first segment, a second and a third segment are allowed to pass the exposure station by allowing the continued movement of the photosensitive member during the scan-back time, and a second latent image is formed on a fourth segment. More specifically, FIG. 3 illustrates such process. During a first revolution of the photosensitive member 10, a first and a second latent image $Im_1$ and $Im_2$ are formed, as shown at (I) of FIG. 3. During a second revolution, a third latent image $Im_3$ is formed, as shown at (II) of FIG. 3. Finally, during a third revolution, a fourth latent image $Im_4$ is formed, as shown at (III) of FIG. 3. Where an increased number of copies are to be produced, the same procedure is repeated.

Considering the condition when the latent image $Im_4$ has been formed, it will be seen that the photosensitive member 10 has undergone three revolutions and the first latent image has been utilized three times. During the fourth revolution of the photosensitive member 10, an electrostatic latent image is formed anew on the first segment, so that in order for the copies to be consecutively produced, it follows that the latent image be utilized exactly three times.

Thus, for a number of segments $N_S$ which is equal to four, the maximum efficiency is achieved by choosing a number of times $N_T$ the same latent image is utilized which is equal to three. For a number of times the latent image is utilized which satisfies the relationship $N_T \leqq 4$ and a number of segments $N_S$ which satisfies the relationship $N_S \leqq 6$, it will be understood that the best efficiency is achieved by the particular relationships between $N_T$ and $N_S$. Specifically, when $N_T=2$, the number of segments $N_S$ may be either 1 or 3 or 5. For $N_T=3$, the optimum value of $N_S$ is equal to either four or six. For $N_T=4$, the optimum value of $N_S$ is equal to 5. In this manner, the operational efficiency of the electrophotographic process can be effectively improved in accordance with the invention.

It should be understood that the invention is equally applicable to magnifications other than unity.

Obviously, numerous modifications and variations of the present invention are possible in light of the above teachings. It is therefore to be understood that within the scope of the appended claims, the invention may be practiced otherwise than as specifically described herein.

What is claimed is:

1. An electrophotographic process, comprising the step of:

moving a photosensitive member in the form of a belt and having a number of image forming regions, $N_S$, on a peripheral surface thereof, where $N_S$ is equal to or greater than one, along an arcuate path so that the peripheral surface undergoes a cyclic movement in a given direction and such that said photosensitive member presents a planar configuration in the area where it is subject to exposure;

using a means for defining a slitwise exposure position, slitwise exposing the photosensitive member to a light image of an original during the movement of said photosensitive member thereby to define an electrostatic latent image which corresponds to the original, comprising, moving, simultaneous to moving of said photosensitive member, the location of said slitwise exposure position at a uniform rate in the direction of movement of the peripheral surface of said photosensitive member and selecting the number of times, $N_T$, the same latent image is used in subsequent developing processing to be equal to or greater than two;

developing each said same latent image into a resulting visual image;

transferring each said resulting visual image from said photosensitive member to another media.

2. An electrophotographic process according to claim 1 in which the number $N_T$ is equal to two and the number $N_S$ is equal to one number from the numbers one, three and five.

3. An electrophotographic process according to claim 1 in which $N_T$ is equal to three while $N_S$ is equal to one number from the numbers four and six.

4. An electrophotographic process according to claim 1 in which $N_T$ is equal to four while $N_S$ is equal to five.

5. An electrophotographic process according to claim 2, 3, 4 or 1 in which the original is placed in planar form and the slitwise exposure of the photosensitive member takes place through a movement of a focusing lens system.

6. An electrographic process according to claim 5, wherein:

magnification is unity.

7. An electrographic process according to claim 5, wherein:

magnification other than unity is employed.

8. An electrophotograhic process according to claim 2, 3, 4 or 1 in which the original is placed in planar form and in which an exposure optics comprises a stationary focusing lens and a movable mirror, the movement of which achieves the slitwise exposure of the photosensitive member.

9. An electromagnetic process according to claim 8, wherein:

magnification is unity.

10. An electrographic process according to claim 8, wherein:

magnification other than unity is employed.

11. An electrophogoraphic process according to claim 2, 3, 4 or 1 in which magnification is unity.

12. An electrophotographic process according to claim 2, 3, 4 or 1 in which magnification other than unity is employed.

* * * * *